Dec. 9, 1924.　　　　　　　　　　　1,518,350
T. PARKER ET AL
SAFETY HEADLIGHT
Filed May 28, 1923

Inventors
Thaddeus Parker.
James C. Lawrence.
Fred G. Dunn.
By
H. J. O'Brien
Attorney Patented Dec. 9, 1924.

1,518,350

UNITED STATES PATENT OFFICE.

THADDEUS PARKER, JAMES C. LAWRENCE, AND FRED G. DUNN, OF PRIMERO, COLORADO.

SAFETY HEADLIGHT.

Application filed May 28, 1923. Serial No. 641,836.

*To all whom it may concern:*

Be it known that we, THADDEUS PARKER, JAMES C. LAWRENCE, and FRED G. DUNN, citizens of the United States, residing at Primero, county of Las Animas, and State of Colorado, have invented certain new and useful Improvements in Safety Headlights; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automobile headlights of the type described in our copending application, Serial No. 621,532, filed February 27, 1923.

It is the object of this invention to produce a headlight that can be readily tilted about a horizontal axis so that the driver, by moving a lever conveniently located on the steering post, may change the angle of the lamps with respect to the roadbed and direct the light onto the roadbed directly in front of and close to the car as is often necessary when the road is rough, or direct the light on the roadbed a long distance ahead of the car as is often desirable for fast driving on good roads and in approaching a hill.

It is a further object of our invention to make it possible to prevent the glare of the headlights from interfering with the vision of an approaching driver and at the same time provide good illumination on the roadbed.

We are aware that lamps have been so mounted that they may be tilted about a horizontal axis and we therefore do not claim to have invented this in its broad aspect, but we consider ourselves to be the inventors of a new combination of means whereby the lamps may be mounted so that they will not rattle, and whereby they may be moved by the rotation of a handle movably secured to the steering post.

In order to better and more clearly describe our invention we shall have reference to the attached drawing in which the preferred embodiment thereof is shown, and in which.

The same reference numerals will be used to designate the same or similar parts throughout the several views.

Figure 4:
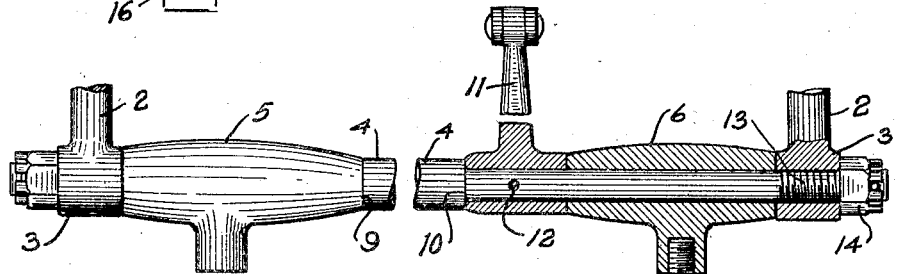
Fig. 4 is a detail partly in section showing the axle to which the lamps are secured.

The headlights $1^R$ and $1^L$ have each secured thereto a bracket 2 whose free end 3 is provided with an opening for the reception of the end of the shaft 4 which is rotatably mounted in bearings 5 and 6 and which are formed with threaded sockets which are connected with the upper ends of the supporting brackets 7 and 8. The shaft 4 is preferably made of five-eighths inch material and ends reduced to one-half inch, thus leaving shoulders 9 and 10. In Fig. 4 the bearing 6 is shown in section. This view shows the arm 11 in place on the reduced end of the shaft with one side thereof abutting the shoulder 10 and held against rotation by means of a pin 12. The other side of arm 11 abuts the end of the bearing 6, against the outer end of which the side of the lamp supporting bracket 2 abuts. The bracket 2 is threaded to the end of the shaft, as indicated by numeral 13, which prevents it from rotating. A nut 14 serves to clamp the parts together and to hold them in adjusted position. The nut 14 and the bracket 2 are tightened so as to prevent rattling, and may be used to adjust the parts to compensate for wear. The bearing 5 on the other side of the car is made exactly the same as the one described, except the arm 11 is omitted and the shoulder 9 abuts the end of the bearing.

Figures 5, 6:
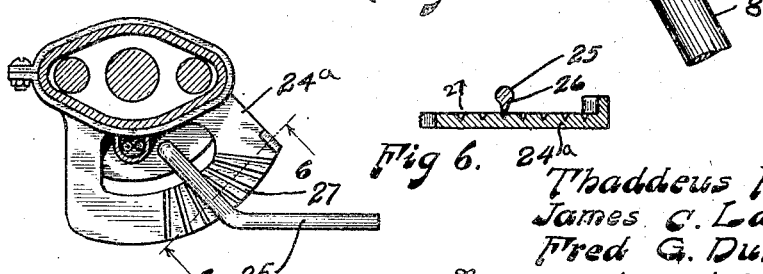
Fig. 5 is a section taken on line 5—5, Fig. 3.
Fig. 6 is a section taken on line 6—6, Fig. 5.

Pivotally connected to the upper end of the arm 11 is a rod 15 which passes rearwardly through an opening between the radiator shell 16 and the side of the radiator 17 and has its other end connected by means of a ball and socket joint 18 with the end of the lever 19 which is rigidly secured to the lower end of the rod 20. Rod 20 is rotatably connected to the steering post 21 by means of brackets 22 and 23. A spring 24 surrounds the rod 21 and abuts the upper side of arm 19 and the lower side of bracket 23. Secured to the steering post near the upper end thereof is a quadrant 24ª in which the upper end of rod 20 is pivoted in the manner indicated in Fig. 5. The upper end of rod 20 is bent at right angles to form a handle 25 whose lower side is provided with a sharpened blade portion 26 which engages the notches 27. It is evident that when the handle 25 is rotated, the arm 19 will move and this will reciprocate the rod 15 and rock the shaft 4, thus tilting the headlights. When the handle 25 is moved upwardly (Fig. 5) the rod 15 will be moved rearwardly and the lamps tilted upwardly while by moving the handle 25 downwardly, the lamps are tilted downwardly.

Figure 1:
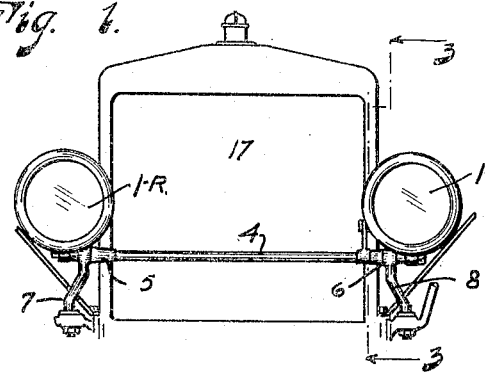
Fig. 1 is a front view of a portion of an automobile showing our improved headlights in place.
Figure 2:
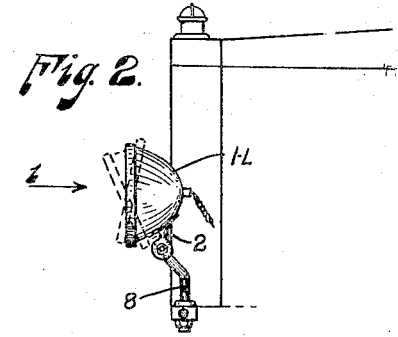
Fig. 2 is a side elevation of the parts shown in Fig. 1.
Figure 3:
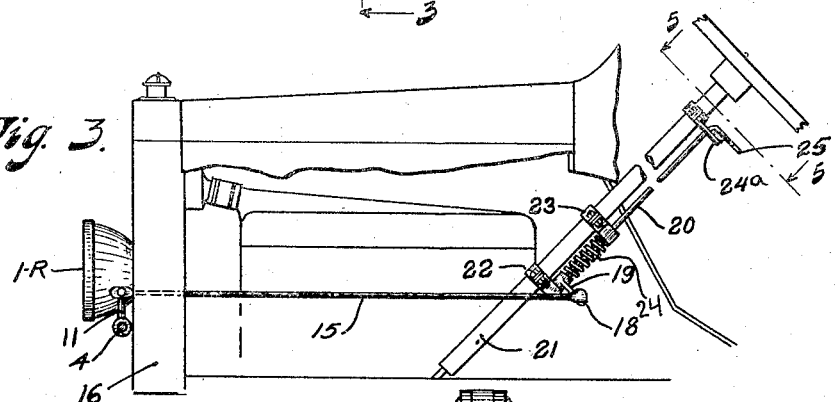
Fig. 3 is a view taken on line 3—3, Fig. 1.

In Fig. 2 we have shown by dotted lines the two extreme positions of the lamps and the normal position by full lines.

The mechanism above described enables the driver to tilt the lamps at will so as to obtain the best results and to prevent them from interfering with the vision of the drivers of approaching cars. For city driving the lights can be tilted downwardly to such an extent that the rays will not interfere with anyone and at the same time the roadway will be well illuminated. The parts are so constructed and arranged that there will be no rattle and if the parts should become loose and worn, they can be quickly tightened.

We want to call particular attention to the advantage of having the control handle 25 secured to the steering post, as this makes it convenient for the driver to adjust the same and is easier to install than if it was controlled by other means, such, for example, as pedals.

Having now described our invention, what we claim as new is:

A tiltable lamp for automobiles, comprising, in combination, a frame, a pair of spaced supporting brackets rigidly secured to the frame at their lower ends, said brackets being provided with elongated bearings at their upper ends, a shaft having its ends journaled in said bearings, a crank arm non-rotably secured to the shaft adjacent the inner end of one of said elongated bearings, a lamp support non-rotatably secured to each end of said shaft adjacent the outer end of each of said elongated bearings, said crank arm and said lamp supports extending from the same side of the shaft, nuts on the ends of the shaft for holding the parts in place thereon, a rod pivotally mounted in parallel relation to the steering post, a quadrant secured to the steering post near the upper end thereof, a handle on the upper end of the rod, said handle having an edgelike portion adapted to engage the quadrant, said quadrant having the surface adjacent the handle provided with notches, two spaced brackets secured to the steering post at a point below the quadrant, said brackets being provided with bearings for the reception of the rod, a crank secured to said rod intermediate the brackets and adjacent the lower bracket, a spring surrounding the rod, the lower end of the spring resting on the crank on the rod and the upper end engaging the upper bracket, said spring being under compression, a rodlike member connecting the crank on the shaft to the crank on the rod, and a ball and socket joint between the end of the rodlike member and the end of the crank on the rod.

In testimony whereof we affix our signatures.

THADDEUS PARKER.
JAMES C. LAWRENCE.
FRED G. DUNN.